United States Patent
Tanaka

(10) Patent No.: US 9,029,435 B2
(45) Date of Patent: May 12, 2015

(54) PHOTOCURABLE COMPOSITION

(75) Inventor: Masayuki Tanaka, Tokyo (JP)

(73) Assignee: Three Bond Fine Chemical Co., Ltd., Kanagawa (JP)

( * ) Notice: Subject to any disclaimer, the term of this patent is extended or adjusted under 35 U.S.C. 154(b) by 0 days.

(21) Appl. No.: 14/113,685

(22) PCT Filed: Apr. 23, 2012

(86) PCT No.: PCT/JP2012/060861
§ 371 (c)(1),
(2), (4) Date: Oct. 24, 2013

(87) PCT Pub. No.: WO2012/147692
PCT Pub. Date: Nov. 1, 2012

(65) Prior Publication Data
US 2014/0045963 A1 Feb. 13, 2014

(30) Foreign Application Priority Data
Apr. 26, 2011 (JP) .................................. 2011-098444

(51) Int. Cl.
| | | |
|---|---|---|
| C08J 3/28 | (2006.01) | |
| C08F 2/46 | (2006.01) | |
| C08G 61/04 | (2006.01) | |
| C08L 33/06 | (2006.01) | |
| C08F 299/00 | (2006.01) | |
| C09K 3/10 | (2006.01) | |

(52) U.S. Cl.
CPC ............... *C08L 33/06* (2013.01); *C08F 299/00* (2013.01); *C09K 3/10* (2013.01); *C09K 2003/1062* (2013.01); *C09K 2200/0625* (2013.01)

(58) Field of Classification Search
CPC .................. C08L 33/06; C08F 299/00; C09K 2003/1062; C09K 3/10; C09K 2200/0625
USPC .................................... 522/115, 111, 1; 520/1
See application file for complete search history.

(56) References Cited

U.S. PATENT DOCUMENTS

2007/0203296 A1 * 8/2007 Okada et al. .................. 525/166

FOREIGN PATENT DOCUMENTS

| JP | 2005-23206 | | 1/2005 |
| JP | 2005-023206 | * | 1/2005 |
| WO | 2005/087890 | | 9/2005 |

OTHER PUBLICATIONS

Nakagawa et al, JP 2005-023206 Machine Translation Part 1, Jan. 27, 2005.*
Nakagawa et al, JP 2005-023206 Machine Translation Part 2, Jan. 27, 2005.*
International Search Report for PCT/JP2012/060861, dated Jul. 10, 2012.
International Preliminary Report on Patentability for PCT/JP2012/060861, dated Nov. 7, 2013, and English translation thereof.

* cited by examiner

*Primary Examiner* — Ling Choi
*Assistant Examiner* — Jessica E Whiteley
(74) *Attorney, Agent, or Firm* — Roylance, Abrams, Berdo & Goodman, L.L.P.

(57) ABSTRACT

[Problem] To provide a photocurable sealing material which exhibits stable physical properties, particularly permanent compression set when subjected to a heat resistance test in an atmosphere of 100 to 150° C., and has a stable applying shape and storage stability.

[Solution] A photocurable composition containing components (A) to (C) mentioned below, in which the mass ratio of the component (A) to the component (B) is 3:7 to 8:2;
  component (A): a compound having a polymer of a (meth) acrylic monomer as a main skeleton and having one (meth)acryl group at each of the both terminals;
  component (B): a compound having a polymer of a (meth) acrylic monomer as a main skeleton and having one (meth)acryl group at only one terminal; and
  component (C): a photoinitiator.

6 Claims, 3 Drawing Sheets

9,029,435 B2

PHOTOCURABLE COMPOSITION

TECHNICAL FIELD

The present invention relates to a photocurable composition which is cured by irradiation with energy rays and provides a cured product having excellent heat resistance as well as elasticity. More specifically, the invention relates to a photocurable composition which provides a cured product with heat resistance, in particular, favorable permanent compression set, and thus can be used as an in-vehicle sealing material.

BACKGROUND ART

A silicone resin is known in the related art as a resin having heat resistance which hardly shows change in hardness in an atmosphere of 100 to 150° C. Main skeleton of a silicone resin has a spiral shape, and heat resistance is exhibited by such unique skeleton. However, as containing low molecular weight siloxane (i.e., cyclic siloxane of D3 to D10), the silicone resin may have an adverse influence on an electrical and electronic part. Further, a silicone resin of moisture curing type requires a certain period of time for deep section curing. A silicone resin of heat curing type also requires a heating period. For such reasons, it is disadvantages in terms of workability compared to a photocurable type resin which is cured by irradiation with energy rays like UV rays.

A (meth)acryl polymer having a (meth)acryl group at both terminals (hereinafter, also referred to as a "polymer (A)") is a known material, and a cured product of the polymer (A) is known to have elasticity and is used as a material for substituting a silicone resin. Although the polymer (A) has advantages that it can be cured by light and/or heat and also does not generate a low molecular weight siloxane, it is difficult to form a cured product with soft property peculiar to a silicone resin. In recent years, a (meth)acryl polymer having a (meth)acryl group at only one terminal (hereinafter, also referred to as a "polymer (B)") is known and, by mixing the polymer (A) with the polymer (B), a possibility of obtaining the same elasticity as the silicone resin has been found. However, by simple mixing as described in Patent Literature 1, a sticker is obtained but it is not suitable for applications as a sealing agent and an adhesive.

It has been also reported to use an active energy curable type composition obtained by mixing the polymer (A) and the polymer (B) as a form-in-place gasket as described in Patent Literature 2, in which a sheet-like cured product is produced first by irradiation with light and the permanent compression set is measured. The composition for a form-in-place gasket indicates that the composition is applied in place and cured by irradiation with energy rays in the same place to form a gasket. Thus, investigation on the composition needs to be made in terms of properties including viscosity and fluidity. In general, when an organic filler and/or an inorganic filler for controlling viscosity are not added, dripping of the composition occurs as the properties are not maintained, and thus it cannot be used as a gasket. On the other hand, in accordance with addition of a filler, physical properties of the cured product change. Further, when a sealing material is produced by punching after curing into a sheet-like form, remaining sheets are yielded, and thus poor production efficiency is caused. For such reasons, forming a sealing material by in-place applying enhances production efficiency.

CITATION LIST

Patent Literatures

Patent Literature 1: JP-2005-23206 A
Patent Literature 2: WO 2005/087890 A

SUMMARY OF INVENTION

Technical Problem

As a durability test, when a heat resistance test is performed for a cured product which is obtained by curing a composition of the related art in an atmosphere of 100 to 150° C., not only the physical properties, in particular, permanent compression set, is unstable but also a stabilized applying shape of the composition is not obtained so that it was difficult to have a photocurable composition with desired performances.

Means for Solving Problem

Under the circumstances, inventors of the present invention conducted intensive studies to solve the problems described above, and completed the invention explained below.

(1) A photocurable composition containing components (A) to (C) mentioned below, in which the mass ratio of the component (A) to the component (B) is 3:7 to 8:2;
 component (A): a compound having a polymer of a (meth) acrylic monomer as a main skeleton and having one (meth) acryl group at each of the both terminals;
 component (B): a compound having a polymer of a (meth) acrylic monomer as a main skeleton and having one (meth) acryl group at only one terminal; and
 component (C): a photoinitiator.

(2) The photocurable composition described in above (1), in which weight average molecular weight of the component (A) and the component (B) is 10000 to 50000.

(3) The photocurable composition described in above (1) or (2), in which fumed silica having an alkyl group added surface is contained as a component (D) in an amount of 0.1 to 30 parts by mass with respect to 100 parts by mass of the total of the component (A) and the component (B).

(4) The photocurable composition described in any one of above (1) to (3), in which a (meth)acrylic monomer having one (meth)acryl group per molecule is contained as the component (E) in an amount of 0.1 to 10 parts by mass per 100 parts by mass of the total of the component (A) and the component (B).

(5) A sealing material containing the photocurable composition described in any one of above (1) to (4), which is used for a case not having a flat surface as a sealing surface.

(6) A sealing material containing the photocurable composition described in any one of above (1) to (4) or the sealing material described in above (5), which is used for a case of a control device or a motor case.

(7) A sealing material containing the photocurable composition described in any one of above (1) to (4) or the sealing material described in above (5) or (6), which is used for an in-vehicle electronic control unit.

Advantageous Effect of the Invention

According to the invention, a photocurable composition which provides a cured product having physical properties, particularly stable permanent compression set when sub-

DESCRIPTION OF EMBODIMENTS

Figure 1:
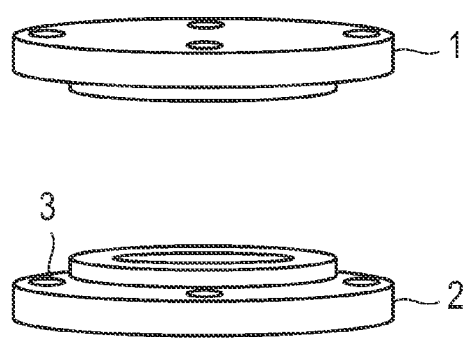
FIG. 1 is a perspective view schematically illustrating a jig for measuring permanent compression set.

The present invention is explained in detail hereinbelow. The component (A) which may be used in the invention includes a compound having a polymer of a (meth)acrylic monomer as a main skeleton and having one (meth)acryl group at each of the both terminals. Here, the term "(meth)acryl" is a general term for acryl and methacryl. In the component (A), a (meth)acryl group having reactivity is present at both terminals of the main skeleton.

The (meth)acrylic monomer constituting the main skeleton of the component (A) is not particularly limited, and various ones may be used. The term "(meth)acrylic monomer" is a general term for monomers having an acryl group (acryloyl group) or a methacryl group (methacryloyl group). Specific examples thereof include (meth)acrylic acid and its derivatives such as (meth)acrylic acid, methyl (meth)acrylate, ethyl (meth)acrylate, n-propyl(meth)acrylate, isopropyl(meth)acrylate, n-butyl (meth)acrylate, isobutyl (meth)acrylate, tert-butyl (meth)acrylate, n-pentyl(meth)acrylate, n-hexyl (meth)-acrylate, cyclohexyl(meth)acrylate, n-heptyl(meth)acrylate, n-octyl(meth)acrylate, 2-ethylhexyl(meth)acrylate, nonyl(meth)acrylate, decyl(meth)acrylate, dodecyl(meth)acrylate, phenyl(meth)acrylate, toluoyl(meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl(meth)acrylate, stearyl(meth)acrylate, glycidyl(meth)acrylate, 2-aminoethyl (meth)acrylate, γ-(methacryloyloxypropyl)trimethoxysilane, an ethylene oxide adduct of (meth)acrylic acid, a (meth)acrylate monomer containing fluorine like trifluoroethyl (meth)acrylate and perfluorooctylethyl (meth)acrylate, but not limited thereto. In the invention, although a (meth)acrylic monomer may be selected from the above and used for polymerization, it is preferred in the invention to select a (meth)acrylic monomer having a hydrocarbon group.

The weight average molecular weight of the component (A) is preferably 10000 to 50000. When the weight average molecular weight is 10000 or higher, elasticity of the cured product is favorably exhibited so that an occurrence of cracks in the cured product during a heat resistance test can be suppressed. Further, when the weight average molecular weight is 50000 or lower, viscosity is not excessively increased and an occurrence of stringy state during applying of the photocurable composition can be suppressed.

The component (A) can be obtained by various polymerization methods. Although the method is not particularly limited, from the viewpoint of versatility of a monomer and easiness of reaction control, a radical polymerization may be preferably used. Among the radical polymerization methods, a controlled radical polymerization is preferable, a living radical polymerization is more preferable, and an atom transfer radical polymerization is particularly preferable. Further, examples of the method for introducing a (meth)acryl group to the polymer of (meth)acrylic monomer as the main skeleton include: (1) a method based on a reaction between a vinyl polymer having a hydroxyl group at the terminal and a (meth)acrylate compound containing chlorine, bromine, or a hydroxyl group; (2) a method based on a reaction between a vinyl polymer having a halogen group at the terminal and a (meth)acrylate compound containing an alkali metal ion or a quaternary ammonium ion; and (3) a method of reacting a vinyl polymer having a hydroxyl group at the terminal with a diisocyanate compound and reacting a (meth)acrylate containing a hydroxyl group with residual isocyanate group. Those methods are already publicly known, and are described in JP-S61-133201 A, JP-H11-80250 A, JP-2000-38404 A, JP-2001-271055 A, JP-2002-69121 A (US 2002/0132930 A) and the like.

The component (B) which may be used in the invention is a compound having a polymer of a (meth)acrylic monomer as a main skeleton and having one (meth)acryl group at only one terminal. Since a (meth)acryl group having reactivity is remained at only one terminal in the component (B), and by containing a pre-determined amount of the component (B), a cured product with favorable rubber elasticity and flexibility can be obtained. As for the method for producing the component (B), it can be produced, on the basis of the method for producing the component (A), by controlling the equivalents of the (meth)acryl group to be introduced. Meanwhile, a polymer of (meth)acrylic monomer having absolutely no (meth)acryl group in the molecule is known as a plasticizer. However, it is a compound different from the component (B) of the invention.

Like the component (A), the weight average molecular weight of the component (B) is preferably 10000 to 50000. When the weight average molecular weight is 10000 or higher, elasticity of the cured product is favorably exhibited so that an occurrence of cracks in the cured product during a heat resistance test can be suppressed. Further, when the weight average molecular weight is 50000 or lower, viscosity is not excessively increased and an occurrence of stringy state during applying of the photocurable composition can be suppressed.

Mass ratio of the component (A) to the component (B) is essentially 3:7 to 8:2, and preferably 4:6 to 8:2. When the component (A) is 80% by mass or lower with respect to the total of the component (A) and the component (B), the hardness is not easily increased so that a favorable permanent compression set property can be exhibited. Further, when the component (B) is 70% by mass or lower with respect to the total of the component (A) and the component (B), elasticity of the cured product is favorably exhibited. Therefore, crushing during the permanent compression set test can be prevented.

A photoinitiator which may be used as the component (C) of the invention is one which generates an active radical species by irradiation with active energy rays like UV rays to radically polymerize the component (A) and the component (B). Specific examples of the component (C) include acetophenone, propiophenone, benzophenone, xanthol, fluoreine, benzaldehyde, anthraquinone, triphenylamine, carbazole, 3-methylacetophenone, 4-methylacetophenone, 3-pentylacetophenone, 4-methoxyacetophenone, 3-bromoacetophenone, 2,2-diethoxyacetophenone, p-diacetylbenzene, 3-methoxybenzophenone, 2,4,6-trimethylbenzophenone, oligo (2-hydroxy-2-methyl-1-(4-(1-methylvinyl)phenyl)prop anone), 4-allylacetophenone, camphorquinone, 2,4,6-trimethylbenzoyldiphenylphospine oxide, 4-methylbenzophenone, 4-chloro-4'-benzylbenzophenone, 2-hydroxy-2-methyl-1-phenyl-1-propanone, 3-chloroxanthone, 3,9-dichloroxanthone, 3-chloro-8-nonylxanthone, benzoyl, benzoyl methyl ether, benzoin butyl ether, bis(4-dimethylaminophenyl)ketone, benzyl methoxyketal, 2-chlorothioxanthone, o-methyl benzoate, benzyl dimethyl ketal, and methyl benzoyl formate, but not limited thereto.

The component (C) is added preferably in an amount of 0.1 to 10 parts by mass with respect to 100 parts by mass of the total of the component (A) and the component (B). When the component (C) is 0.1 parts by mass or higher, photocurability is favorably exhibited. Further, when it is 10 parts by mass or lower, radical species are generated in a large amount so that hardening of the cured product can be prevented.

The component (D) which may be used in the invention is fumed silica having an alkyl group added surface. Since silanol remains on surface of fumed silica, it is hydrophilic in an untreated state. Meanwhile, a method of hydrophobicizing the surface by adding dimethyldichlorosilane or the like to the silanol is known. In the invention, it is preferable to use, as the component (D), fumed silica obtained by adding a linear alkyl group having 2 or more carbon atoms. Specific examples of the trade names include NKC130, and R805 that are manufactured by Nippon Aerosil Co., Ltd. Although there are various types of fumed silica product with treated surface, since a surface-treated product without adding an alkyl group tends to precipitate during storage for a long period of time after being dispersed in a photocurable composition, fumed silica obtained by adding an alkyl group on the surface is preferable as the component (D) of the invention.

The component (D) is added preferably in an amount of 0.1 to 30 parts by mass with respect to 100 parts by mass of the total of the component (A) and the component (B). More preferably, it is added in an amount of 10 to 30 parts by mass. When the component (D) is 0.1 parts by mass or higher, dripping of the composition due to excessively low viscosity is prevented so that the applying shape can be maintained. Further, when it is 30 parts by mass or lower, wave-like shape of the surface is prevented so that the cross-section of the shape on bead application can be stabilized in a semi-circle shape.

The component (E) which can be used in the invention is a low molecular weight (meth)acrylic monomer which has one (meth)acryl group in one molecule and a molecular weight of lower than 1000. Although the component (E) is not particularly limited, those identical to the (meth)acrylic monomer constituting the main skeleton of the component (A) and/or the component (B) can be used.

Examples of the preferred component (E) include a (meth)acrylic monomer having a hydroxyl group in the molecule and/or a (meth)acrylic monomer with a saturated alicyclic structure. The component (E) is added preferably in an amount of 0.1 to 20 parts by mass with respect to 100 parts by mass of the total of the component (A) and the component (B), and more preferably 0.1 to 10 parts by mass. When the component (E) is 20 parts by mass or lower, the cured product is not in a brittle state so that the physical properties can be maintained during the heat resistance test. Further, when the component (D) is 0.1 parts by mass or higher, viscosity is not excessively high so that applying properties is favorably maintained and also the viscosity of the photocurable composition is not increased so that a problem of occurring stringy state can be suppressed. Depending on the purpose, the component (E) is suitably used.

Specific examples of the (meth)acrylic monomer having a hydroxyl group include 2-hydroxyethyl (meth)acrylate, 2-hydroxypropyl(meth)acrylate, 2-hydroxybutyl (meth)acrylate, 2-(meth)acryloyloxyethyl succinate, 2-(meth)acryloyloxyethyl hexahydrophthalate, and 2-(meth)acryloyloxyethyl-2-hydroxypropylphthalate. Among them, 2-hydroxypropylmethacrylate and/or 2-hydroxyethylmethacrylate are preferable, but not limited thereto.

Specific examples of the (meth)acrylic monomer with a saturated alicyclic structure include isobornyl(meth)acrylate, dicyclopentanyl(meth)acrylate, cyclohexyl(meth)acrylate, and adamantanyl(meth)acrylate. Among them, a (meth)acrylic monomer having an isobornyl skeleton and/or a dicyclopentanyl skeleton are preferable, but not limited thereto.

In order to cure a shade area which is not irradiated with light, a thermal curability can be imparted by adding an organic peroxide to the photocurable composition of the invention. Specific examples of the organic peroxide include ketone peroxides such as methyl ethyl ketone peroxide, cyclohexanone peroxide, 3,3,5-trimethylcyclohexanone peroxide, methylcyclohexanone peroxide, methylacetoacetate peroxide, and acetylacetone peroxide; peroxyketals such as 1,1-bis(tert-butylperoxy)-3,3,5-trimethylcyclohexane, 1,1-bis(tert-butylperoxy)cyclohexane, 2,2-bis(tert-butylperoxy)octane, n-butyl-4,4-bis(tert-butylperoxy)valerate, and 2,2-bis(tert-butylperoxy)butane; hydroperoxides such as tert-butyl hydroperoxide, cumene hydroperoxide, diisopropylbenzene hydroperoxide, p-menthane hydroperoxide, 2,5-dimethylhexane-2,5-dihydroperoxide, and 1,1,3,3-tetramethylbutyl hydroperoxide; dialkyl peroxides such as di-tert-butyl peroxide, tert-butylcumyl peroxide, dicumyl peroxide, α,α'-bis(tert-butylperoxy-m-isopropyl)benzene, 2,5-dimethyl-2,5-di(tert-butylperoxy)hexane, and 2,5-dimethyl-2,5-di(tert-butylperoxy)-3-hexyne; diacyl peroxides such as acetyl peroxide, isobutyryl peroxide, octanoyl peroxide, decanoyl peroxide, lauroyl peroxide, 3,5,5-trimethylhexanoyl peroxide, succinic acid peroxide, benzoyl peroxide, 2,4-dichlorobenzoyl peroxide and m-toluoyl peroxide; peroxy dicarbonates such as diisopropylperoxy dicarbonate, di-2-ethylhexylperoxy dicarbonate, di-n-propylperoxy dicarbonate, bis-(4-tert-butylcyclohexyl)peroxy dicarbonate, dimyristylperoxy dicarbonate, di-2-ethoxyethylperoxy dicarbonate, dimethoxyisopropylperoxy dicarbonate, di(3-methyl-3-methoxybutyl)peroxy dicarbonate and diallylperoxy dicarbonate; peroxy esters such as tert-butylperoxy acetate, tert-butylperoxy isobutyrate, tert-butylperoxy pivalate, tert-butylperoxy neodecanoate, cumylperoxy neodecanoate, tert-butylperoxy-2-ethylhexanoate, tert-butylperoxy-3,5,5-trimethyl hexanoate, tert-butylperoxy laurate, tert-butylperoxy benzoate, di-tert-butylperoxy isophthalate, 2,5-dimethyl-2,5-di(benzoylperoxy)hexane, tert-butylperoxymaleic acid, tert-butylperoxyisopropyl carbonate, cumylperoxy octoate, tert-hexylperoxy neodecanoate, tert-hexylperoxy pivalate, tert-butylperoxy neohexanoate, tert-hexylperoxy neohexanoate and cumylperoxy neohexanoate; acetylcyclohexylsulfonyl peroxide; and tert-butylperoxy allyl carbonate, but not limited thereto.

In order to adjust physical properties, various additives, for example, an anti-aging agent, a plasticizer, a physical property-adjusting agent, a solvent may be blended in the photocurable composition of the invention.

Although the anti-aging agent is not necessarily required, a conventionally known anti-oxidant and photostabilizer may be suitably used. Further, the anti-aging agent can also be used for polymerization control at the time of polymerization, and thus physical properties can be controlled.

Various anti-oxidants have been known, and examples thereof include thioether-based anti-oxidants, phosphorous-based anti-oxidants, hindered-phenol based anti-oxidants, monoactylate phenol-based anti-oxidants, and nitroxide-based anti-oxidants. Among them, the hindered phenol-based anti-oxidants described below are preferable.

Specific examples of the thioether-based anti-oxidants include MARK PEP-36 and MARK AO-23 (both are manufactured by Adeca Argus Chemical Co., Ltd.).

Specific examples of the phosphorous-based anti-oxidants include Irgafos 38, Irgafos 168 and Irgafos P-EPQ (all are manufactured by Nihon Ciba-Geigy K.K.).

Specific examples of the hindered phenol-based compounds include 2,6-di-t-butyl-4-methylphenol, 2,6-di-t-butyl-4-ethylphenol, mono (or di or tri)(α-methylbenzyl)phenol, 2,2'-methylenebis(4-ethyl-6-t-butylphenol), 2,2'-methylenebis(4-methyl-6-t-butylphenol), 4,4'-butylidenebis(3-methyl-6-t-butylphenol), 4,4'-thiobis(3-methyl-6-t-butylphenol), 2,5-di-t-butylhydroquinone, 2,5-di-t-amylhydroquinone, triethylene glycol-bis[3-(3-t-butyl-5-methyl-4-hydroxyphenyl) propionate], 1,6-hexanediol-bis[3-(3,5-di-t-butyl-4-hydroxyphenyl) propionate], 2,4-bis(n-octylthio)-6-(4-hydroxy-3,5-di-t-butylanilino)-1,3,5-triazine, pentaerythrityl-tetraquis[3-(3,5-di-t-butyl-4-hydroxyphenyl)propionate], 2,2-thio-diethylenebis[3-(3,5-di-t-butyl-4-hydroxyphenyl) propionate], octadecyl-3-(3,5-di-t-butyl-4-hydroxyphenyl) propionate, N,N'-hexamethylenebis(3,5-di-t-butyl-4-hydroxy-hydrocinnamide), 3,5-di-t-butyl-4-hydroxy-benzylphosphonate-diethyl ester, 1,3,5-trimethyl-2,4,6-tris(3,5-di-t-butyl-4-hydroxybenzyl)-benzene, calcium bis(3,5-di-t-butyl-4-hydroxybenzylethylphosphonate), tris(3,5-di-t-butyl-4-hydroxybenzyl)isocyanurate, 2,4-bis[(octylthio)methyl]-o-cresol, N,N'-bis[3-(3,5-di-t-butyl-4-hydroxyphenyl)propionyl]hydrazine, tris(2,4-di-t-butylphenyl)phosphite, 2-(5-methyl-2-hydroxyphenyl)benzotriazole, 2-[2-hydroxy-3,5-bis(α,α-dimethylbenzyl)phenyl]-2H-benzotriazole, 2-(3,5-di-t-butyl-2-hydroxyphenyl)benzotriazole, 2-(3-t-butyl-5-methyl-2-hydroxyphenyl)-5-chlorobenzotriazole, 2-(3,5-di-t-butyl-2-hydroxyphenyl)-5-chlorobenzotriazole, 2-(3,5-di-t-amyl-2-hydroxyphenyl)benzotriazole, 2-(2'-hydroxy-5'-t-octylphenyl)benzotriazole, a condensate of methyl-3-[3-t-butyl-5-(2H-benzotriazole-2-yl)-4-hydroxyphenyl] propionate and polyethylene glycol (molecular weight: about 300), a derivative of hydroxyphenylbenzotriazole, bis(1,2,2,6,6-pentamethyl-4-piperidyl) 2-(3,5-di-t-butyl-4-hydroxybenzyl)-2-n-butylmalonate, and 2,4-di-t-butylphenyl-3,5-di-t-butyl-4-hydroxybenzoate. Mentioned by trade names, there can be exemplified but are not limited to NOCRAK 200, NOCRAK M-17, NOCRAK SP, NOCRAK SP-N, NOCRAK NS-5, NOCRAK NS-6, NOCRAK NS-30, NOCRAK 300, NOCRAK NS-7 and NOCRAK DAH (all the above are manufactured by Ouchi Shinko Chemical Industrial Co., Ltd.), MARK AO-30, MARK AO-40, MARK AO-50, MARK AO-60, MARK AO-616, MARK AO-635, MARK AO-658, MARK AO-80, MARK AO-15, MARK AO-18, MARK AO-328 and MARK AO-37 (all the above are manufactured by Adeca Argus Chemical Co., Ltd.), IRGANOX-245, IRGANOX-259, IRGANOX-565, IRGANOX-1010, IRGANOX-1024, IRGANOX-1035, IRGANOX-1076, IRGANOX-1081, IRGANOX-1098, IRGANOX-1222, IRGANOX-1330 and IRGANOX-1425WL (all the above are manufactured by Nihon Ciba-Geigy K.K.), and SUMILIZER GA-80 (manufactured by Sumitomo Chemical Co., Ltd.).

Specific examples of the monoacrylate phenol-based anti-oxidants include 2-t-butyl-6-(3-t-butyl-2-hydroxy-5-methylbenzyl)-4-methy 1-phenyl acrylate (trade name: SUMILIZER GM) and 2,4-di-t-amyl-6-[1-(3,5-di-t-amyl-2-hydroxyphenyl)ethyl]phenyl acrylate (trade name: SUMILIZER GS).

Specific examples of the nitroxide-based anti-oxidants include a nitroxy free radical derived from a cyclic hydroxylamine like a 2,2,6,6-substituted-1-piperidinyloxy radical and a 2,2,5,5-substituted-1-pirrolidinyloxy radical. As the substituent group, an alkyl group having 4 or lower carbon atoms such as a methyl group or an ethyl group is suitable. Specific examples of the nitroxy free radical compounds include but are not limited to a 2,2,6,6-tetramethyl-1-piperidinyloxy radical (TEMPO), a 2,2,6,6-tetraethyl-1-piperidinyloxy radical, a 2,2,6,6-tetramethyl-4-oxo-1-piperidinyloxy radical, a 2,2,5,5-tetramethyl-1-pirrolidinyloxy radical, 1,1,3,3-tetramethyl-2-isoindolinyloxy radical, and an N,N-di-t-butylamine-oxy radical. A stable free radical such as a galvinoxyl free radical may be used in lieu of the nitroxy free radical.

The anti-oxidants may be used in combination with the light stabilizer. Specific examples of the light stabilizer include bis(1,2,2,6,6-pentamethyl-4-piperidyl) sebacate (trade name: SANOL). The combined use leads to better exhibition of the effect thereof, and particularly improves heat resistance in some cases, so that it is particularly preferred. In addition, there may be used Tinuvin C353 and Tinuvin B75 (both the above are manufactured by Nihon Ciba-Geigy K.K.) in which the anti-oxidant and the light stabilizer are mixed in advance.

The photocurable composition of the invention can be used for various sealing materials. A sealing material containing the photocurable composition of the invention can be applied to a sealing section, a potting section, or the like and cured by irradiation with active energy rays like UV rays or visible rays, and it has favorable workability. In addition, for a case in which an adherend has a plurality of kinds of shapes or has a complex shape, a sealing material is formed by in-place applying of the photocurable composition in accordance with the shape of the adherend followed by curing, and thus a variety of sealings can be dealt by the present invention. In addition, the cured product obtained by curing the photocurable composition of the invention has particularly favorable permanent compression set after a heat resistance test, and thus it is suitable for an in-vehicle sealing application. By sealing in-vehicle electronic parts, in-vehicle electronic substrates, or in-vehicle motors in a case, adverse environmental influences can be avoided. When a sealing surface of a case is flat, there is less concern for a sealing material. However, in general, when a sealing surface is not flat or has irregularities, damages of the sealing material tend to easily occur on a convex region. For such reasons, when there are irregularities on a sealing surface, lower permanent compression set of the sealing material is preferred for maintaining the sealing property.

Specific examples of the application of the sealing material include assembly of an in-vehicle electronic substrate or an in-vehicle electrical and electronic part which requires heat resistance, and sealing of a control device case of an in-vehicle electronic substrate and an in-vehicle motor case. In particular, the in-vehicle control device case is also referred to as an electronic control unit, and specific examples thereof include an engine control device (i.e., engine control unit), a throttle control device, and a control device for exhaust gas recycling. Further, specific examples of the in-vehicle motor case include a motor case for a power window or a wiper. When sealing an in-vehicle control device case, there may be a case in which the sealing surface is not flat or has three-dimensional irregularities. To exhibit the sealing property in such a region, the cured product is required to have lower permanent compression set. In this regard, since the sealing material of the invention has favorable heat resistance and favorable permanent compression set, it can be used for the applications described above.

EXAMPLES

Hereinafter, the present invention is explained in more detail by exemplifying examples, but the invention should not be limited to the following examples.

Preparation Example 1

As the component (A), a compound having the main skeleton consisting of a polymer of a (meth)acrylic monomer and having one (meth)acryl group at each of the both terminals was produced as follows. By using copper (I) bromide as a catalyst, pentamethyl diethylenetriamine as a ligand, and diethyl-2,5-dibromoadipate as an initiator, n-butyl acrylate was polymerized. The obtained polymer (300 g) was dissolved in N,N-dimethyl acetamide (300 ml), potassium acrylate (5.3 g) was added thereto, and the resultant was stirred for 3 hours under heating at 70° C. in a nitrogen atmosphere to obtain a liquid mixture containing poly(n-butyl acrylate) which has an acryl group at both terminals (hereinbelow, referred to as "polymer 1"). N,N-Dimethyl acetamide in the liquid mixture was distilled off under reduced pressure. After that, toluene was added to the residues and the insoluble matters were removed by filtration. Toluene in the filtrate was distilled off under reduced pressure, thereby purifying the polymer 1. The polymer 1 after the purification had a weight average molecular weight of 32308, dispersity of 1.36, and an average number of terminal acryl group of 2.0 (i.e., introduction rate of an acryl group to the terminal was 1000).

Preparation Example 2

As the component (B), a compound having the main skeleton consisting of a polymer of a (meth)acrylic monomer and having one (meth)acryl group at only one terminal was prepared as follows. By using copper (I) bromide as a catalyst, pentamethyl diethylenetriamine as a ligand, and diethyl-2,5-dibromoadipate as an initiator, n-butyl acrylate was polymerized. The obtained polymer (300 g) was dissolved in N,N-dimethyl acetamide (300 ml), potassium acrylate (2.6 g) was added thereto, and the resultant was stirred for 3 hours under heating at 70° C. in a nitrogen atmosphere to obtain a liquid mixture containing poly(n-butyl acrylate) which has an acryl group at only one terminal (hereinbelow, referred to as "polymer 2"). N, N-Dimethyl acetamide in the liquid mixture was distilled off under reduced pressure. After that, toluene was added to the residues and the insoluble matters were removed by filtration. Toluene in the filtrate was distilled off under reduced pressure, thereby purifying the polymer 2. The polymer 2 after the purification had a weight average molecular weight of 14334, dispersity of 1.31, and an average number of terminal acryl group of 1.0 (i.e., introduction rate of an acryl group to the terminal was 50%).

The aforementioned "weight average molecular weight" and "dispersity" (i.e., ratio between weight average molecular weight and number average molecular weight) were calculated by a standard polystyrene conversion method using gel permeation chromatography (GPC). As a GPC column, two columns filled with polystyrene cross-linked gel (SHODEX GPC K-802.5, manufactured by Showa Denko K.K) (SHODEX GPCK-804; manufactured by Showa Denko K.K) were connected in series and used. As a solvent for GPC, chloroform was used.

Further, the aforementioned "average number of terminal acryloyl group" means "average value of the number of acryloyl groups that are introduced to the terminal per polymer molecule" and it was calculated by $^1$H-NMR analysis and the number average molecular weight which has been obtained by GPC.

Examples 1 to 13 and Comparative examples 1 to 6

For producing a photocurable composition, the following components were prepared (hereinafter, the photocurable composition is described as a "composition").

Component (A): a compound having a polymer of a (meth) acrylic monomer as a main skeleton and having one (meth) acryl group at each of the both terminals
  Polymer 1
Component (B): a compound having a polymer of a (meth) acrylic monomer as a main skeleton and having one (meth) acryl group at only one terminal
  Polymer 2
Component (B'): a polymer of a (meth)acrylic monomer having no (meth)acryl group
  Plasticizer: an acryl polymer-based plasticizer with weight average molecular weight of 6000 (ARUFON UP-1080, manufactured by TOAGOSEI CO., LTD.)
Component (C): a photoinitiator
  Photoinitiator: a mixture of benzophenone and 1-hydroxycyclohexyl phenyl ketone of a mass ratio of 1:2
Component (D): fumed silica having an alkyl group added surface
  Silica 1: fumed silica having octyl silane group added (AEROSIL R805, manufactured by Nippon Aerosil Co., Ltd.)
Component (D'): fumed silicate other than the component (D)
  Silica 2: fumed silica having methacryl group added surface (AEROSIL R7200, manufactured by Nippon Aerosil Co., Ltd.)
Component (E): a (meth)acrylic monomer having one (meth)acryl group in one molecule
  Monomer 1: isobornyl acrylate (LIGHT Acrylate IB-XA, manufactured by Kyoeisha Chemical Co., Ltd.)
Component (E): a (meth)acrylic monomer other than the component (E)
  Monomer 2: a bifunctional acryl oligomer with a polyester skeleton (UV-3000B, manufactured by The Nippon Synthetic Chemical Industry Co., Ltd.)
  Monomer 3: trimethylolpropane triacrylate (LIGHT Acrylate TMPA, manufactured by Kyoeisha Chemical Co., Ltd.)

The component (A) and the component (B) were weighed (for the composition containing the component (E), the component (E) was also weighed with the component (A) and the component (B)), added into the vessel of a stirrer and stirred for 15 minutes until becoming homogeneous. Subsequently, the component (D) was weighed and added thereto. Degassing under vacuum was performed for 30 min until there is no lump of the component (D) and the mixture became homogeneous. Stirring was followed for an additional hour. Detailed amounts for the preparation are as described in Table 1, in which all the values are described in parts by mass.

TABLE 1

| | Name of starting materials | Example 1 | Example 2 | Example 3 | Example 4 | Example 5 | Example 6 | Example 7 |
|---|---|---|---|---|---|---|---|---|
| Component (A) | Polymer 1 | 80 | 60 | 40 | 40 | 40 | 40 | 40 |
| Component (B) | Polymer 2 | 20 | 40 | 60 | 60 | 60 | 60 | 60 |
| Component (B') | Plasticizer | | | | | | | |
| Component (E) | Monomer 1 | | | | | | | |
| Component (E') | Monomer 2 | | | | | | | |
| | Monomer 3 | | | | | | | |
| Component (D) | Silica 1 | 10 | 10 | 10 | 10 | 10 | 20 | 12.5 |
| Component (D') | Silica 2 | | | | 5 | 10 | | 12.5 |
| Component (C) | Photoinitiator | 4.0 | 4.0 | 4.0 | 4.0 | 4.0 | 4.0 | 4.0 |
| | Total | 114.0 | 114.0 | 114.0 | 119.0 | 124.0 | 124.0 | 129.0 |

| | Name of starting materials | Example 8 | Example 9 | Example 10 | Example 11 | Example 12 | Example 13 | Comparative example 6 |
|---|---|---|---|---|---|---|---|---|
| Component (A) | Polymer 1 | 30 | 30 | 40 | 40 | 40 | 40 | 40 |
| Component (B) | Polymer 2 | 70 | 70 | 60 | 60 | 60 | 60 | 60 |
| Component (B') | Plasticizer | | | | | | | |
| Component (E) | Monomer 1 | | | | 10 | 20 | | |
| Component (E') | Monomer 2 | | | | | | 20 | |
| | Monomer 3 | | | | | | | 30 |
| Component (D) | Silica 1 | 10 | 10 | 10 | 12.5 | 12.5 | 12.5 | |
| Component (D') | Silica 2 | | 5 | 10 | 12.5 | 12.5 | 12.5 | 25.0 |
| Component (C) | Photoinitiator | 4.0 | 4.0 | 4.0 | 4.0 | 4.0 | 4.0 | 4.0 |
| | Total | 114.0 | 119.0 | 134.0 | 149.0 | 149.0 | 159.0 | 129.0 |

| | Name of starting materials | Comparative example 1 | Comparative example 2 | Comparative example 3 | Comparative example 4 | Comparative example 5 |
|---|---|---|---|---|---|---|
| Component (A) | Polymer 1 | 100 | 20 | 100 | 100 | 80 |
| Component (B) | Polymer 2 | | 80 | | | |
| Component (B') | Plasticizer | | | | | 20 |
| Component (E) | Monomer 1 | | | 10 | 10 | |
| Component (E') | Monomer 2 | | | | | |
| | Monomer 3 | | | | 10 | |
| Component (D) | Silica 1 | 10 | 10 | 12.5 | 12.5 | 12.5 |
| Component (D') | Silica 2 | | | 12.5 | 12.5 | 12.5 |
| Component (C) | Photoinitiator | 4.0 | 4.0 | 4.0 | 4.0 | 4.0 |
| | Total | 114.0 | 114.0 | 139.0 | 149.0 | 129.0 |

For the photocurable compositions obtained in Examples 1 to 13 and Comparative examples 1 to 6, storage stability regarding the properties was confirmed. In addition, as physical properties, hardness, tensile shear strength, elongation percentage, and permanent compression set were measured for the cured product obtained by curing the photocurable compositions obtained in Examples 1 to 13 and Comparative examples 1 to 6. As a durability test, a heat resistance confirmation test was performed. The initial measurement result before the durability test, measurement result after the durability test, and change rate of the physical properties before and after the durability test are summarized in Table 2.

[Confirmation of Storage Stability]

The un-cured photocurable composition was left to stand for 30 days under a 40° C. atmosphere, and then the appearance was observed with a naked eye to see any change in the composition. When there is no change, it was evaluated as "good". When there is precipitation of the filler (i.e., the component (D)), it was evaluated as "bad."

[Measurement of Hardness (Shore-C or Shore-A)]

The photocurable composition set in a state for having a thickness of 6 mm was irradiated with UV rays of 45 kJ/m$^2$ (wavelength; 10 to 400 nm) using an UV irradiation apparatus to produce a sheet-like cured product. Then, while maintaining the pressurizing surface of a type A durometer (hardness tester) parallel to the sheet-like cured product, pressurization was quickly performed with a force of 10 N without having any shock so that the pressurizing surface and the sample are closely adhered to each other. The maximum value at the time of performing the measurement at 25° C. was read, and the maximum value was taken as "hardness (no unit)" Details are based on JIS K 6253. When the cured product has a lower hardness at a high temperature atmosphere (125° C.), it can comply with the expansion and constraction of the volume. Therefore, it is preferable that if the hardness is A, it is softer than A15 and if the hardness is C, it is softer than C70.

[Measurement of Tensile Shear Strength]

The photocurable composition was set to have a thickness of 2 mm and irradiated with UV rays of 45 kJ/m$^2$ (wavelength; 10 to 400 nm) using an UV irradiation apparatus to produce a sheet-like cured product. The sheet-like cured product was then punched with a No. 3 dumbbell to prepare a test piece. Both ends of the test piece were fixed to a chuck such that long axis of the test piece is on a straight line with the center of the chuck. The test piece was stretched at a tension rate of 50 mm/min. The maximum load was measured and the strength under the maximum load was designated as "tensile shear strength (MPa)". Details are based on JIS K 6850. It is preferable to have a tensile shear strength of 0.3 MPa or higher.

[Measurement of Elongation Percentage]

The photocurable composition was set to have thickness of 2 mm and irradiated with UV rays of 45 kJ/m² (wavelength; 10 to 400 nm) using an UV irradiation apparatus to produce a sheet-like cured product. The sheet-like cured product was then punched with a No. 3 dumbbell to prepare a test piece, to which was then added marked lines at an interval of 25 mm. The test piece was fixed to a chuck in the same manner as the tensile shear strength measurement, and stretched at a tension rate of 500 mm/min until the test piece was cut. Since the interval between the marked lines was extended due to the stretch of the test piece during measurement, the interval between marked lines was measured using a pair of vernier calipers until the test piece was cut. The proportion of elongation based on the initial interval between marked lines was designated as "elongation percentage (%)". To comply with the expansion and contraction, it is preferable that the elongation percentage is 100% or higher (i.e., two times or more the initial length).

[High Temperature Durability Test]

A portion of the test piece which has been prepared for measuring the hardness, tensile shear strength, and elongation percentage was left to stand for 250 hours in a hot air dryer set to have a 150° C. atmosphere. After that, the test piece was taken out, kept until the temperature thereof became room temperature (25° C., the same applies hereafter), and then subjected to the measurement. Regarding the test, it is preferable that if the hardness is A, it is softer than A18 and if the hardness is C, it is softer than C84. For the tensile shear strength and the elongation percentage, "change rate (%)" of each property between the initial state and the state after keeping at 150° C. was calculated according to numerical formula 1. It is preferable that the absolute value of each change rate is within 20%.

[Numerical formula 1]

$$\text{Change rate (\%)} = \frac{\text{Measurement value after durability test} - \text{Initial measurement value}}{\text{Initial measurement value}} \times 100$$

[Measurement of Permanent Compression Set and Measurement of Critical Upset Ratio]

Figure 2:
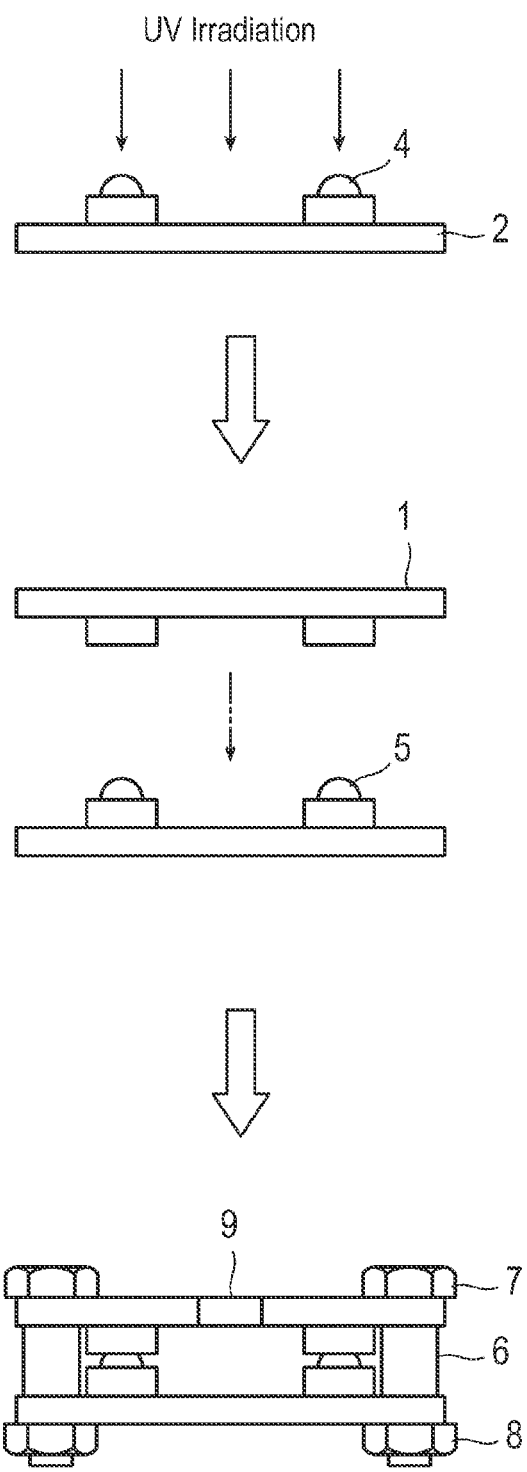
FIG. 2 is a cross-sectional view schematically illustrating a jig at the time of measuring permanent compression set.

After bead applying of the photocurable composition to have a height of 2 mm and a width of 3 mm as shown in FIG. 2 using an aluminum flange with an inner diameter of 56 mm, an outer diameter of 70 mm, and a flange width of 7 mm as shown in FIG. 1, the composition was cured by UV irradiation with a wavelength of 10 to 400 nm and an irradiation quantity of 45 kJ/m² and the thickness of bead after curing was measured. After that, as shown in FIG. 2, the flange was connected with at a compression rate of 45% and left to stand for 250 hours under a 150° C. atmosphere to prepare a test piece. Further, clearance (i.e., gap) of the flange at the time of compression was measured as clearance at compression. The test piece was brought back to room temperature and the thickness of bead after compression was measured. Based on the value obtained by the measurement, "permanent compression set (%)" was calculated according to numerical formula 2. Separately, by increasing the value of "compression rate (%)" defined by numerical formula 3 with respect to the cured product, the "critical compression ratio (%)" indicating an occurrence of cracks in cured product of each composition was confirmed. The permanent compression set is preferably 30% or lower. The critical upset ratio is preferably 45% or higher. The permanent compression set was also measured for an acrylic rubber (ACM)-based O ring which is commonly used as a sealing material, and it was found to have the permanent compression set of 79%.

[Numerical formula 2]

$$\text{Permanent compression set (\%)} = \frac{\text{Bead thickness (mm)} - \text{Bead thickness after compression (mm)}}{\text{Bead thickness (mm)} - \text{Clearance at the time of compression (mm)}} \times 100$$

[Numerical formula 3]

$$\text{Compression rate (\%)} = \frac{\text{Bead thickness (mm)} - \text{Clearance at the time of compression (mm)}}{\text{Bead thickness (mm)}} \times 100$$

TABLE 2

| | Test item | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Initial state | Hardness | C68(A13) | C55 | C26 | C29 | C33 | C30 | C40 | C21 | C21 | C38 |
| | Elongation percentage | 190 | 220 | 255 | 265 | 260 | 235 | 200 | 291 | 295 | 178 |
| | Tensile shear strength | 0.7 | 0.6 | 0.4 | 0.7 | 0.9 | 0.9 | 1.2 | 0.4 | 0.5 | 0.7 |
| High temperature durability test (after 150° C. × 250 hours) | Hardness | C80 | C67 | C40 | C42 | C48 | C32 | C49 | C25 | C25 | C57 |
| | Elongation percentage | 173 | 208 | 220 | 225 | 225 | 190 | 185 | 250 | 300 | 167 |
| | Change rate of elongation percentage | −9 | −5 | −14 | −15 | −13 | −19 | −8 | −14 | 2 | −6 |
| | Tensile shear strength | 0.6 | 0.5 | 0.4 | 0.6 | 0.8 | 0.9 | 1.1 | 0.5 | 0.5 | 0.8 |
| | Change rate of tensile shear strength | −9 | −11 | −5 | −14 | −11 | 0 | −8 | 13 | 0 | 14 |

TABLE 2-continued

|  |  |  |  |  |  |  |  |  |  |  |
|---|---|---|---|---|---|---|---|---|---|---|
|  | Permanent compression set | 20 | 24 | 18 | 18 | 20 | 25 | 25 | 16 | 17 | 27 |
|  | Critical upset ratio | 45% | 45% | 55% | 55% | 55% | 55% | 55% | 55% | 55% | 45% |
|  | Storage stability | Good | Good | Good | Good | Good | Good | Good | Good | Good | Good |

| | Test item | Example 11 | Example 12 | Example 13 | Comparative example 6 | Comparative example 1 | Comparative example 2 | Comparative example 3 | Comparative example 4 | Comparative example 5 |
|---|---|---|---|---|---|---|---|---|---|---|
| Initial state | Hardness | C72 | C49 | C54 | C38 | C80(A19) | unmeasurable | A38 | A26 | unmeasurable |
| | Elongation percentage | 206 | 240 | 210 | 230 | 176 | unmeasurable | 160 | 200 | 232 |
| | Tensile shear strength | 1.1 | 1.2 | 1.1 | 0.8 | 0.7 | unmeasurable | 2.9 | 2.5 | 0.2 |
| High temperature durability test (after 150° C. × 250 hours) | Hardness | C68 | C54 | C56 | C49 | C97 | unmeasurable | A41 | A29 | unmeasurable |
| | Elongation percentage | 191 | 215 | 205 | 212 | 148 | unmeasurable | 143 | 220 | 159 |
| | Change rate of elongation percentage | −7 | −10 | −2 | −8 | −16 | unmeasurable | −11 | 10 | −31 |
| | Tensile shear strength | 1.2 | 1.1 | 1.0 | 1.0 | 0.5 | unmeasurable | 3.6 | 3.0 | 0.1 |
| | Change rate of tensile shear strength | 9 | −8 | −9 | 25 | −32 | unmeasurable | 24 | 20 | −50 |
| | Permanent compression set | NG | 34 | 37 | 25 | NG | unmeasurable | NG | 75 | NG |
| | Critical upset ratio | lower than 45% | 55% | 55% | 55% | lower than 45% | unmeasurable | lower than 45% | 45% | lower than 45% |
| Storage stability | Storage stability | Good | Good | Good | Bad | Good | Good | Good | Good | Good |

[Leakage Test]

Figure 3:
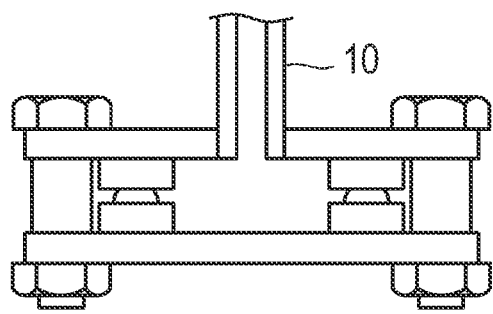
FIG. 3 is a cross-sectional view schematically illustrating a jig at the time of conducting a leakage test.

Leakage test was conducted for Examples 1 to 3 and 8 and also for Comparative examples 1, 2 and 4. The test was carried out using the same flange and bead shape as those for measurement of the permanent compression set. After a test piece being left to stand for 100 hours in a hot air dryer at a 150° C. atmosphere and at a compression rate of 45%, it was taken out from the hot air dryer, cooled down to room temperature, and then subjected to the measurement. In order to send compressed air into the flange for controlling pressure by a pressure gauge, a pressure hose was connected to the flange as shown in FIG. 3. Internal pressure of the flange was increased to a maximum value of 0.1 MPa at a pressure rise of 0.01 MPa/10 sec and at a compression rate of 45%. The maximum pressure and the bead state at the time of leakage were evaluated with a naked eye according to the following three steps. The results are described in Table 3.

Confirmation of Bead State

○: No cracks occurred to the maximum pressure of 0.1 MPa

Δ: Cracks are present at the bead interface x: Cracks are present inside the bead

TABLE 3

| Test item | Example 1 | Example 2 | Example 3 | Example 8 | Comparative example 1 | Comparative example 2 | Comparative example 3 |
|---|---|---|---|---|---|---|---|
| Maximum pressure | 0.1 | 0.1 | 0.1 | 0.1 | 0.02 | 0.06 | 0.03 |
| Bead state | ○ | ○ | ○ | ○ | Δ | x | Δ |

From Examples and Comparative examples, it is found that, for maintaining physical properties in terms of high temperature durability, an optimum range of the mass ratio for mixing the component (A) and the component (B) is limited. The optimum range of mass ratio for mixing the component (A) and the component (B) is 3:7 to 8:2. It is assumed that, when the added amount of the component (B) having few curable functional groups is excessively high, it has property as an adhesive rather than as a sealing material as shown in Comparative example 2, and repulsion against external force cannot exhibit. On the other hand, when the amount of the component (B) is excessively low as shown in Comparative example 1, the cured product exhibits no elasticity, and as a result, the performance of permanent compression set is impaired, and the performance cannot be maintained even when a polymer of a (meth)acrylic monomer having no reactive group is used instead of the component (B) as shown in Comparative example 5. In particular, when a cured product has no elasticity for sealing applications, pressure against an adherend is not secured and air tightness cannot be maintained in the leakage test as shown in Table 3.

INDUSTRIAL APPLICABILITY

Since the photocurable composition of the present invention is cured in a relatively short time compared to other curing types like thermal curing or moisture curing, a line takt is shortened. Therefore, it can contribute to improvement of efficiency for producing parts, substrates, and the like. In addition, although a soft cured product exhibits serious deterioration in physical properties after durability test at a high temperature, the cured product obtained by curing the photocurable composition of the invention has little change in permanent compression set under an atmosphere of 150° C., in particular, and it can maintain stable physical properties. As being capable of maintaining elasticity, it can comply with the expansion and contraction caused by temperature change and hardly causes problems like cracks in the cured product. The photocurable composition of the invention having the properties are most suitably used not only in a field of electricity but also in a field of automobiles which particularly requires high durability, as a sealing application for an in-vehicle electrical and electronic part and an in-vehicle case.

REFERENCE SIGNS LIST

1: Upper flange
2: Lower flange
3: Hole for bolts and nuts
4: Sealing material
5: Cured product
6: Spacer
7: Bolt
8: Nut
9: Hose connection part for internal pressurization
10: Pressure hose

The invention claimed is:

1. A photocurable composition comprising components (A) to (C) mentioned below, in which the mass ratio of the component (A) to the component (B) is 3:7 to 8:2;
   component (A): a compound having a polymer of a (meth)acrylic monomer as a main skeleton and having one (meth)acryl group at each of the both terminals;
   component (B): a compound having a polymer of a (meth)acrylic monomer as a main skeleton and having one (meth)acryl group at only one terminal;
   component (C): a photoinitiator; and
   fumed silica having an alkyl group added on a surface of the fumed silica as a component (D) in an amount of 0.1 to 30 parts by mass with respect to 100 parts by mass of the total of the component (A) and the component (B).

2. The photocurable composition according to claim 1, in which a weight average molecular weight of the component (A) and the component (B) is 10000 to 50000.

3. The photocurable composition according to claim 1, in which a (meth)acrylic monomer having one (meth)acryl group in one molecule is contained as a component (E) in an amount of 0.1 to 10 parts by mass with respect to 100 parts by mass of the total of the component (A) and the component (B).

4. A sealing material containing the photocurable composition described in claim 1, which is used for a case not having a flat surface as a sealing surface.

5. A sealing material containing the photocurable composition described in claim 1, which is used for a control device case or a motor case.

6. A sealing material containing the photocurable composition described in claim 1, which is used for an in-vehicle electronic control unit.

* * * * *